April 21, 1964     C. O. JONES, JR     3,129,625
LEVEL AND SLOPE CONTROL FOR RECIPROCATING MACHINES
Filed Jan. 7, 1963     3 Sheets-Sheet 1
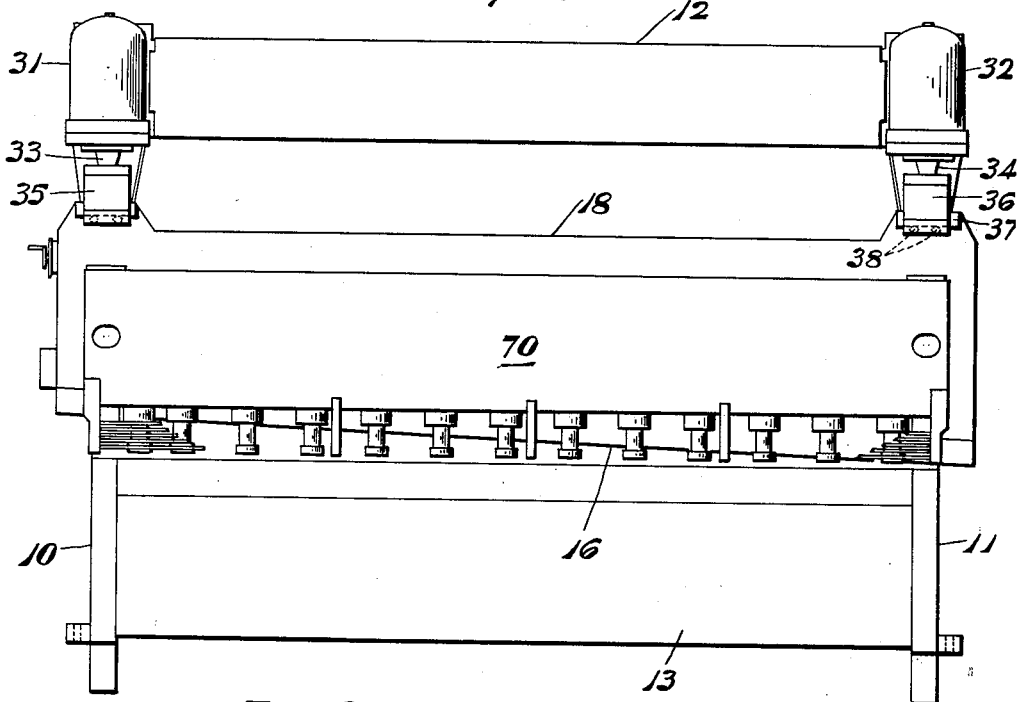
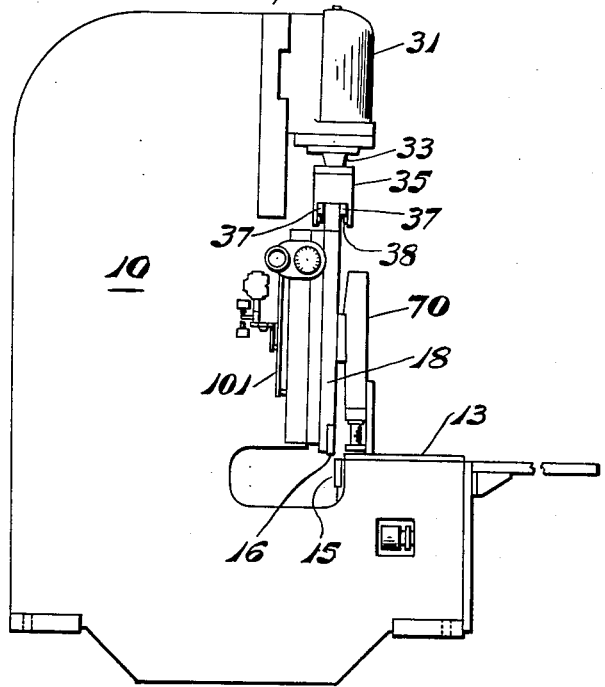
INVENTOR.
CLARENCE O. JONES, JR.
BY
Christel & Bean
ATTORNEYS

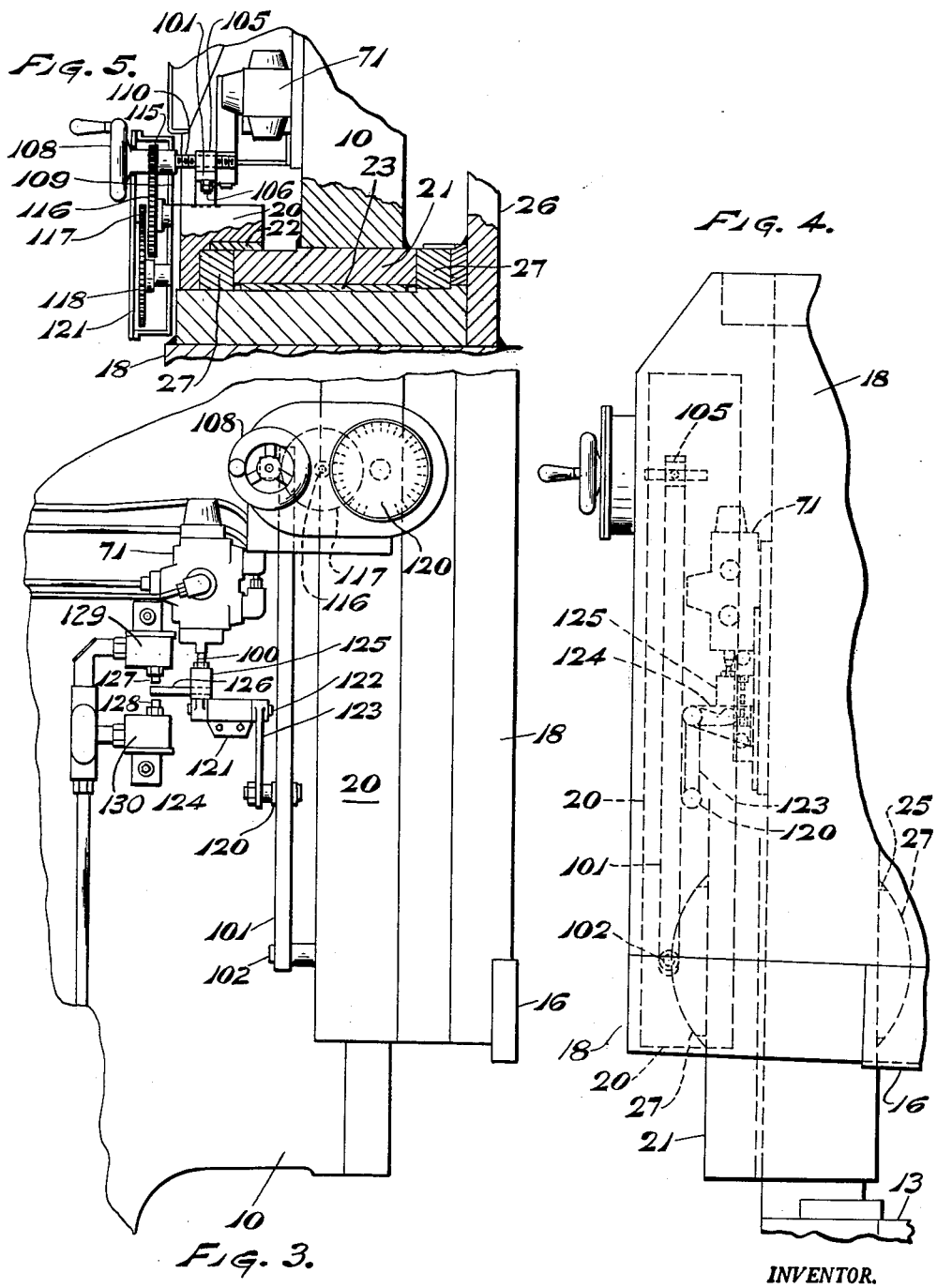

United States Patent Office 3,129,625
Patented Apr. 21, 1964

3,129,625
LEVEL AND SLOPE CONTROL FOR
RECIPROCATING MACHINES
Clarence O. Jones, Jr., Eggertsville, N.Y., assignor to
Niagara Machine & Tool Works, Buffalo, N.Y.
Filed Jan. 7, 1963, Ser. No. 249,712
8 Claims. (Cl. 83—624)

This invention relates to hydraulic power squaring shears and similar cyclic metal working machines or other reciprocating machines and more particularly to means for correcting and controlling the horizontal disposition or angularity of a reciprocating shear knife or similar work-engaging member.

In hydraulically operated reciprocating machines wherein the work member is of considerable longitudinal extent and particularly wherein hydraulic power devices act against the member adjacent to opposite ends thereof to reciprocate the same, a problem is recognized to exist with respect to maintaining the working member in a desired horizontal disposition or at a desired angle with respect to the horizontal. Means for maintaining such disposition are generally referred to in the art as leveling devices or arrangements and the present invention is concerned particularly with such a leveling device. More particularly, the invention concerns means for directly translating an out-of-level condition to a corrective hydraulic impulse in a novel manner and further concerns novel means for adjustably establishing an initial disposition of the working member at a predetermined angle with respect to the horizontal.

In hydraulic power squaring shears by way of example, it is known that the angularity of the reciprocating shear knife with respect to the stationary shear knife, that is the degree of "shear," has different optimum values for different sheet or plate thicknesses. In general terms the thicker the sheet or plate to be sheared, the greater the desired angularity between the stationary and reciprocating shear knives. The present invention, in addition to the means for correcting and maintaining a desired disposition of the reciprocating shear knife, provides means for simply and accurately adjusting the initial disposition of the reciprocating shear knife to a desired angle suitable to the thickness of the sheet or plate to be sheared, the kind of material, and other operating conditions.

In prior art leveling devices of this general nature the most commonly employed means for translating conditions of misalignment to a corrective hydraulic impulse have been tape devices, one of which is illustrated in Munschauer et al. Patent No. 3,059,431, dated October 23, 1962. In the leveling device of the present invention this type of misalignment calibrating device is replaced by a simple adjustable upright bar or the like which adjustably reflects conditions of misalignment and acts directly against valve means for producing calibrated corrective impulses. Furthermore, the angularity of the upright bar may be directly adjusted to produce a desired angular disposition of the working edge of the reciprocating member of the machine, the reciprocating shear knife in the case of a power squaring shear.

A single embodiment of the principles of the present invention is illustrated schematically in the accompanying drawings and described in the following specification but it is to be understood that such embodiment is by way of illustration only and that various alterations and modifications may be made without departing from the principles of the invention, the scope thereof being limited only as defined in the appended claims.

In the drawings:

FIG. 1 is a general front elevational view of a hydraulic power squaring shear embodying one form of the level and slope control arrangement of the present invention;

FIG. 2 is a side elevational view thereof;

FIG. 3 is a fragmentary side elevational view, viewed the same as FIG. 2 but on a larger scale;

FIG. 4 is a fragmentary front elevational view of the structure shown in FIG. 3;

FIG. 5 is a fragmentary top plan view, partially in cross section, of the structure shown in FIGS. 3 and 4.

Figure 6:
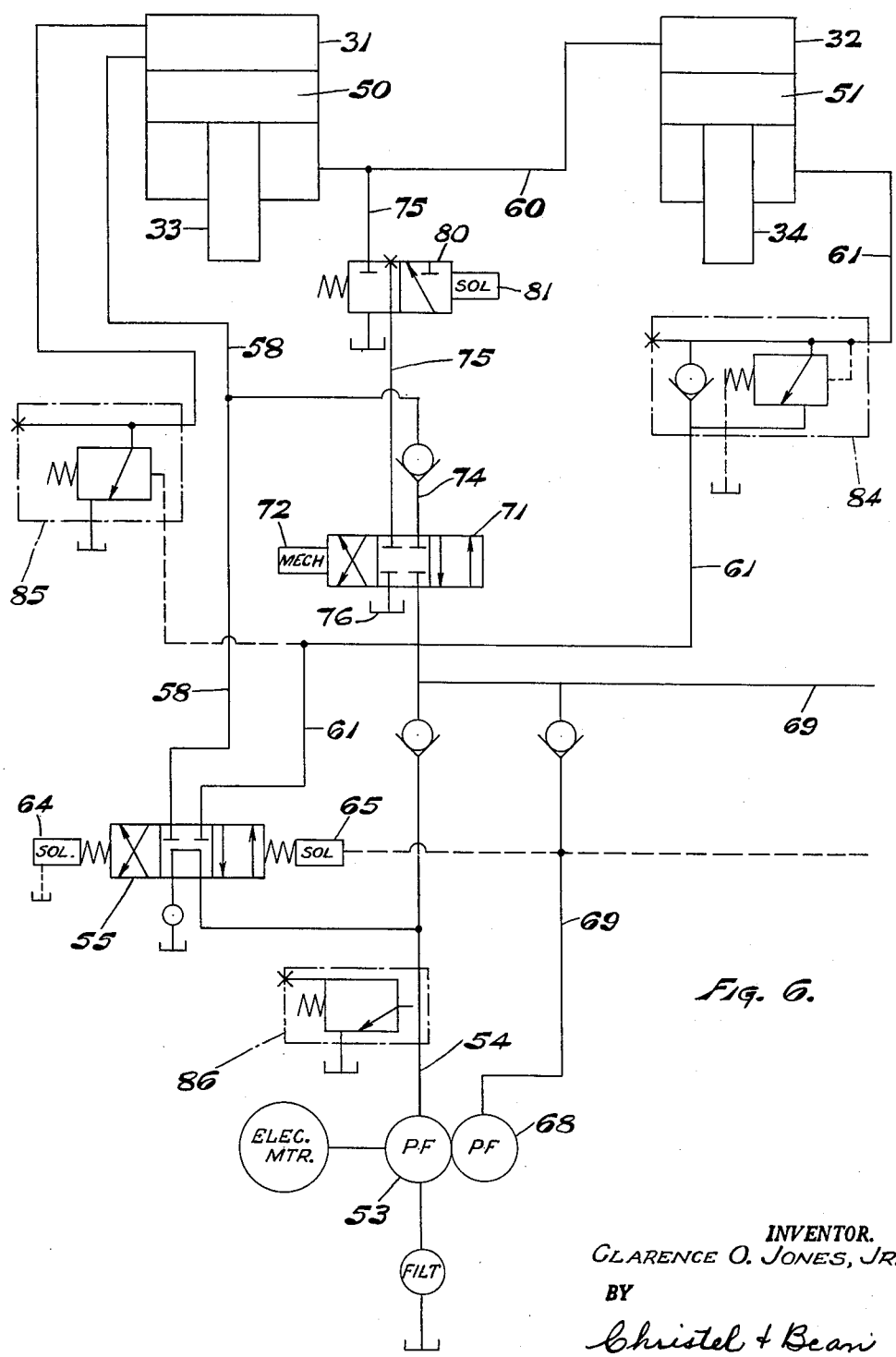
FIG. 6 is a hydraulic circuit diagram which schematically illustrates one form of hydraulic control arrangement operating in accordance with the present invention.

Like characters of reference denote like parts throughout the several figurse of the drawings. It is to be understood that the general hydraulic shear structure, apart from the level and slope control arrangement of the present invention, is more or less conventional. Referring particularly to FIGS. 1 and 2, the shear comprises a pair of side frame members 10 and 11 which are rigidly connected by a crown 12 and a bed member 13.

A stationary shear knife at the rear edge of bed 13 is designated 15 and a reciprocating shear knife 16 is carried by a crosshead 18 which is guided for reciprocation in an approximately vertical plane by guide means at the opposite ends of crosshead 18 as best shown in FIG. 5. The guide means at the left side of crosshead 18 is designated 20 and embraces the outer edge of a vertically extending enlargement 21 at the front of side frame 10. Bearing plates 22 and 23 guide the crosshead 18 accurately in a fore and aft direction but it will be noted that ample clearance is provided between the block 20 and enlargement 21 as regards lateral directions.

The crosshead 18 and the left hand guide block 20 are pivoted to the left hand enlargement 21 as generally indicated at 25, such pivotal engagement being preferably relatively close to the lower left hand shearing edge portion of shear knife 16. Spaced inwardly of the guide blocks 20 the crosshead has fixed thereto rearwardly extending plates 26 which comprise portions of the crosshead reinforcing structure.

As shown in FIGS. 4 and 5, the left hand guide block 20 and plate 26 have facing arcuate recesses which receive arcuate shoes 27. The flat faces of the shoes bear slidingly against the side edges of enlargement 21, whereby the crosshead 18 is both pivotal and vertically slidable with respect to the left hand side frame structure.

A pair of hydraulic cylinders 31 and 32 carried by the upper portion of the frame of the shear include piston rod projecting portions 33 and 34 which connect at their lower ends with U-shaped brackets 35 and 36 which engage over enlargements 37 at the upper edges of crosshead 18. Rollers 38 carried by brackets 35 and 36 engage the under sides of the enlargements 37. The engagement of U-shaped members 35 and 36 and rollers 38 with the enlargements 37 of crosshead 18 permits free relative lateral sliding movement so as not to restrain pivotal adjustment of crosshead 18 on the pivot axis 25.

Thus the crosshead is accurately guided in a predetermined plane of reciprocation by the bearing plates 22 and 23 in fore and aft directions and its angular disposition with respect to pivot 25 is determined entirely by the relative vertical positions of the pistons in the cylinders 31 and 32 and their piston rod portions 33 and 34.

Referring now to the hydraulic diagram, FIG. 6, the hydraulic cylinders 31 and 32 contain pistons 50 and 51 and the cylinders are hydraulically connected to operate in series in the following manner. Output pressure fluid from a pump 53 passes through a conduit 54 to a main direction control valve 55 which is a conventional solenoid controlled, pilot operated, spring centered four-way valve. On the down strokes of the pistons the pressure fluid conduit 54 is connected through valve 55, to a conduit 58 leading to the head end of cylinder 31.

A conduit 60 leads from the annulus or rod end of cylinder 31 to the head end of cylinder 32 and during the aforesaid down stroke the rod end of cylinder 32 is connected to reservoir or tank by a conduit 61 to four-way valve 55. The effective annular area at the underside of piston 50 is the same as the full circular area at the top of piston 51 so that, other things being equal, identical fluid volumes will urge the pistons 50 and 51 downwardly.

The four-way valve 55 is activated from a neutral blocking position to the aforesaid down stroke position by energization of a solenoid 64 and is energized to a reverse up stroke position by energization of a solenoid 65. In the latter position the pressure conduit 54 is connected by conduit 61 to the lower side of the piston 51 of cylinder 32 and conduit 58 is connected from the upper side of piston 50 in cylinder 31 through the four-way valve 55 to tank.

A second hydraulic fluid pressure pump is designated 68 and delivers fluid pressure by way of a conduit 69 to operate hydraulic hold-down means not illustrated herein since it is conventional and forms no part of the present invention. The hold-down member itself is designated 70 in FIGS. 1 and 2. During downward movement of the crosshead a valve (not shown) in the conduit 69 leading to the hold-down cylinder is open to receive hold-down pressure from both conduits 54 and 69. After the hold-down clamps the work excess pressure from the hold-down pump 68 goes to a mechanically operated four-way valve 71 and the main pump pressure goes to four-way valve 55.

The four-way valve 71 has a blocked neutral, position wherein no pressure fluid leaves or enters the same. Valve 71 has a mechanical operating member 72 which is variably movable in opposite directions to move the valve proportionately either to the left or the right of neutral position. When the valve is moved to the left fluid pressure from conduit 69 passes by way of a conduit 74 to the fluid pressure conduit 58, the flow being proportioned to the degree of movement of operating member 72.

At the same time fluid pressure from the conduit 60 which connects the cylinders 31 and 32 is bled through a conduit 75 by way of a blocking valve 80 through valve 71 to tank as at 76. Thus movement of the mechanical operator 72 to the left, as shown in the schematic diagram, causes fluid to be added to conduit 58 and to be bled from conduit 60, thus producing a lower relative position of piston 50 with respect to piston 51.

If mechanical operator 72 is moved to the right as shown in the diagram, pressure conduit 69 connects through conduit 75 to the connecting conduit 60, thus increasing the amount of fluid in the system comprising the lower end of cylinder 31 and the upper end of cylinder 32. This causes piston 51 to assume a lower relative position with respect to piston 50.

In the hydraulic diagram the blocking valve 80 comprises a solenoid operated valve whose operating solenoid 81 is connected in the direction control circuitry which includes solenoids 64 and 65 so that the blocking valve is closed on the down stroke of the pistons, preventing corrective action, and is open on the up stroke so that movements of the operator 72 in either direction from the mean position will cause one of the pistons 50 or 51 to assume a lower relative position with respect to the other piston. The manner in which movements of operator 72 are produced in accordance with variations of the crosshead from a predetermined desired angular relationship will now be described.

In FIG. 6 the numeral 84 designates a conventional counterbalance valve, the numeral 85 designates an unloading valve, and the numeral 86 designates a main relief valve for main pump 53.

Reference will now be had to the adjustable mechanical arrangement provided for controlling and proportioning the regulating movements of four-way valve 71, that is the slope control valve. In this connection, reference will be had particularly to FIGS. 3, 4 and 5 which show the valve regulating mechanism. The valve 71 per se is mounted against the left-hand side frame member 10 and a controlling stem member 100 (corresponding to the operating member 72 of the hydraulic diagram, FIG. 6) projects downwardly therefrom and is movable vertically in opposite axial directions to effect crosshead slope corrections in the hydraulic manner previously described.

An adjustable upright bar 101 is pivoted at its lower end to the guide portion 20 of crosshead 18 as at 102 and is provided at its upper end with means for adjusting the inclination thereof in a plane parallel to the plane of movement of crosshead 18. By way of general explanation, bar 101 normally extends in a vertical direction regardless of the angle of the cutting edge of the shear knife. When the bar 101 moves away from a vertical position the valve 71 and its associated hydraulic circuitry operates to restore the bar 101 to a vertical position by operation of the foregoing hydraulic circuitry under the control of valve 71. Thus if the crosshead 18 inadvertently moves angularly away from its adjusted pivotal position, the valve 71 is operated by camming action of bar 101 against roller 120 and consequent displacement of valve 71 from its neutral position to restore the bar 101 to vertical position. If the inclination of bar 101 be deliberately adjusted to change the angle of the cutting edge of the shear knife, then on the next stroke of the shear valve 71 will operate to restore the bar 101 to vertical position and thus complete the adjustment of the angle of the cutting edge. Incidentally, the included angle between bar 101 and the cutting edge as viewed in FIG. 1 determines the amount of "shear" and it is this included angle which is adjusted to vary the amount of "shear."

A nut member 105 is pivoted to the upper end of bar 101 as by means of a screw portion 106 and an adjusting hand wheel 108 rotatably carried by a mounting plate 109 has a screw portion 110 engaging in nut 105. Rotation of hand wheel 108 moves nut 105 axially along screw 110 to pivot bar 101 to define various angles relative to the cutting edge of shear knife 16.

A pinion 115 fixed to hand wheel 108 and screw 110 meshes with an intermediate gear 116 and a pinion 117 fixed to the latter meshes with a further gear 118 which has fixed thereto a dial 120 which is graduated to indicate the position of angular adjustment of the upper end of bar 101 and thus indicate the angle of "shear" of knife 16. A transparent front plate 121 covers the dial mechanism.

Rotation of the hand wheel 108 in one direction or the other will automatically reduce or increase this angle of "shear," by operation of the hydraulic circuitry described above in conjunction with FIG. 6, as desired to suit various working conditions.

A roller 120 bears against the right-hand edge of bar 101, as viewed in the front view, FIG. 4, so as to be moved in a horizontal direction upon variations in the inclination of bar 101 as the latter moves vertically with reciprocating movement of crosshead 18. These lateral movements of roller 120 are translated directly to vertical movement of valve operating stem 100.

The controlling stem member 100 of valve 71 is internally biased downwardly as viewed in FIGS. 3 and 4 (to the left as viewed in the diagrammatic showing, FIG. 6) to retain the roller 120 in resilient engagement with bar 101. In FIG. 3 the numeral 131 designates an upper casing extension which contains a compression coil spring for this purpose.

A bearing bracket 121 mounted against side frame member 10 rotatably supports a rock shaft 122 which carries a depending arm 123, which in turn carries roller 120, and a generally horizontally extending arm 124 whose outer end is adjustably connected to valve operating stem 100 as at 125.

A bar 126 projecting from valve stem connector member 125 is disposed between the operating members 127 and 128 of a pair of micro-switches 129 and 130, respectively, for shutting down the machine in the event that valve 71 and its various hydraulic adjuncts fail to maintain a proper slope condition as dictated by the setting of hand wheel 108 and the inclination of bar 101.

I claim:

1. In a slope control mechanism for a power squaring shear having a reciprocable shear knife and a pair of hydraulic motor devices adjacent to opposite ends thereof for effecting working and return strokes of the shear knife, a generally upright member movable with said shear knife and pivoted at one end relative thereto on an axis generally perpendicular to the plane of reciprocation of said shear knife, fluid circuit means for reciprocating said hydraulic motor devices, means for adjusting said upright member on said pivot to vary the angle between said member and said shear knife, fluid means for variably transferring operating fluid to and from said circuit means to advance or retract one of said motor devices relative to the other to adjust the angular disposition of said shear knife, valve means for said fluid transfer means having a control member adjacent to said upright member and engageable against an edge thereof, said edge being normally parallel to the direction of reciprocation of said shear knife whereby under normal conditions said control member remains relatively stationary, said control member being moved in one direction or the other by reason of said edge engagement when said upright member assumes an oblique position relative to said direction of reciprocation, said valve means being actuable by said control member movement to transfer fluid and thereby adjust said shear knife angularly and thus restore said upright member to said parallel relation with respect to the direction of reciprocation.

2. In a level control mechanism for a metal working machine having a reciprocable ram and a pair of hydraulic motor devices adjacent to opposite ends thereof for effecting working and return strokes of the ram, a generally upright member movable with said ram and pivoted at one end relative thereto on an axis generally perpendicular to the plane of reciprocation of said ram, fluid circuit means for actuating said hydraulic motor devices, means for adjusting said upright member on said pivot to vary the angle between said member and said ram, fluid means for variably transferring operating fluid to and from said circuit means to advance or retract one of said motor devices relative to the other to adjust the angular disposition of said ram, valve means for said fluid transfer means having a control member adjacent to said upright member and engageable against an edge thereof, said edge being normally parallel to the direction of reciprocation of said ram whereby under normal conditions said control member remains relatively stationary, said control member being moved in one direction or the other by reason of said edge engagement when said upright member assumes an oblique position relative to said direction of reciprocation, said valve means being actuable by said control member movement to transfer fluid and thus restore said ram to level position and thus move said upright member to parallel relation with respect to the direction of reciprocation.

3. In a slope control mechanism for a power squaring shear having a reciprocable shear knife and a pair of hydraulic motor devices adjacent to opposite ends thereof for effecting working and return strokes of the shear knife, a generally upright member movable with said shear knife and pivoted at one end relative thereto on an axis generally perpendicular to the plane of reciprocation of said shear knife, means for adjusting said upright member on said pivot to vary the angle between said member and said shear knife, servo-motor means having a control member adjacent to said upright member and engageable against an edge thereof, said edge being normally parallel to the direction of reciprocation of said shear knife whereby under normal conditions said control member remains relatively stationary, said control member being moved in one direction or the other by reason of said edge engagement when said upright member assumes an oblique position relative to said direction of reciprocation, said servo-motor means being actuable by said control member movement for adjusting said shear knife angularly to restore said upright member to parallel relation with respect to the direction of reciprocation.

4. In a level control mechanism for a metal working machine having a reciprocable ram and a pair of hydraulic motor devices adjacent to opposite ends thereof for effecting working and return strokes of the ram, a generally upright member movable with said ram and pivoted at one end relative thereto on an axis generally perpendicular to the plane of reciprocation of said ram, means for adjusting said upright member on said pivot to vary the angle between said member and said ram, servo-motor means having a control member adjacent to said upright member and engageable against an edge thereof, said edge being normally parallel to the direction of reciproction of said ram whereby under normal conditions said control member remains relatively stationary, said control member being moved in one direction or the other by reason of said edge engagement when said upright member assumes an oblique position relative to said direction of reciprocation, said servo-motor means being actuable by said control member movement to adjust said ram angularly and thus restore said upright member to parallel relation with respect to the direction of reciprocation.

5. In a slope control mechanism for a power squaring shear having a reciprocable shear knife and a pair of hydraulic motor devices adjacent to opposite ends thereof for effecting working and return strokes of the shear knife, a generally upright member movable with said shear knife andd pivoted at one end relative thereto on an axis generally perpendicular to the plane of reciprocation of said shear knife, fluid circuit means for reciprocating said hydraulic motor devices, said fluid circuit means having a source of hydraulic fluid pressure and connecting with said motor devices in series to jointly actuate the same, means for adjusting said upright member on said pivot to vary the angle between said member and said shear knife, fluid means for variably adding or subtracting hydraulic fluid from said circuit between said motor devices to advance or retract one of said motor devices relative to the other to adjust the angular disposition of said shear knife, valve means for variably controlling said fluid means and having a valve control member adjacent to said upright member and engageable against an edge thereof, said edge being normally parallel to the direction of reciprocation of said shear knife whereby under normal conditions said control member remains relatively stationary, said valve control member being moved in one direction or the other by said edge engagement when said upright member assumes an oblique position relative to said direction of reciprocation to advance or retract one of said motor devices relative to the other and thus restore said upright member to parallel relation with respect to the direction of reciprocation and thereby adjust said shear knife angularly.

6. In a level control mechanism for a metal working machine having a reciprocable ram and a pair of hydraulic motor devices adjacent to opposite ends thereof for effecting working and return strokes of the ram, a generally upright member movable with said ram and pivoted at one end relative thereto on an axis generally perpendicular to the plane of reciprocation of said ram, fluid circuit means for reciprocating said hydraulic motor devices, said fluid circuit means having a source of hydraulic fluid pressure and connecting with said motor devices in series to jointly actuate the same, means for adjusting said upright member on said pivot to vary the angle between said member and said ram, fluid means for variably adding or subtracting hydraulic fluid from said circuit between said motor devices to advance or retract one of said motor devices relative to the other to adjust the angular disposition of said ram, valve means for variably controlling said fluid means and having a valve control member adjacent to said upright member and engageable against an edge thereof, said edge being normally parallel to the direction of reciprocation of said ram whereby under normal conditions said control member remains relatively stationary, said valve control member being moved in one direction or the other by said edge engagement when said upright member assumes an oblique position relative to said direction of reciprocation to advance or retract one of said motor devices relative to the other and thus restore said upright member to parallel relation with respect to the direction of reciprocation and thereby adjust said ram angularly to a level condition.

7. In a slope control mechanism for a power squaring shear having a reciprocable shear knife and a pair of hydraulic piston and cylinder devices adjacent to opposite ends thereof for effecting working and return strokes of the shear knife, a generally upright member movable with said shear knife and pivoted at one end thereto on an axis generally perpendicular to the plane of reciprocation of said shear knife, fluid circuit means connecting with said cylinders for actuating said pistons, means for adjusting said upright member on said pivot to vary the angle between said member and said shear knife, fluid means for variably transferring operating fluid to and from said circuit means to advance or retract one of said pistons relative to the other to adjust the angular disposition of said shear knife, valve means for said fluid transfer means having a control member adjacent to said upright member and engageable against an edge thereof, said edge being normally parallel to the direction of reciprocation of said shear knife whereby under normal conditions said control member remains relatively stationary, said control member being moved in one direction or the other by reason of said edge engagement when said upright member assumes an oblique position relative to said direction of reciprocation, said valve means being actuable by said control member movement to transfer fluid and thus restore said upright member to parallel relation with respect to the direction of reciprocation and thereby adjust said shear knife angularly.

8. In a level control mechanism for a metal working machine having a reciprocable ram and a pair of hydraulic piston and cylinder devices adjacent to opposite ends thereof for effecting working and return strokes of the ram, a generally upright member movable with said ram and pivoted at one end thereto on an axis generally perpendicular to the plane of reciprocation of said ram, fluid circuit means connecting with said cylinders for actuating said pistons, means for adjusting said upright member on said pivot to vary the angle between said member and said ram, fluid means for variably transferring operating fluid to and from said circuit means to advance or retract one of said pistons relative to the other to adjust the angular disposition of said ram, valve means for said fluid transfer means having a control member adjacent to said upright member and engageable against an edge thereof, said edge being normally parallel to the direction of reciprocation of said ram whereby under normal conditions said control member remains relatively stationary, said control member being moved in one direction or the other by reason of said edge engagement when said upright member assumes an oblique position relative to said direction of reciprocation, said valve means being actuable by said control member movement to transfer fluid and thus restore said upright member to parallel relation with respect to the direction of reciprocation and thereby adjust said ram to level position.

References Cited in the file of this patent
UNITED STATES PATENTS

| 1,569,569 | Pels _____ Jan. 12, 1926 |

FOREIGN PATENTS

| 1,137,783 | France _____ Jan. 21, 1957 |
| 860,932 | Great Britain _____ Feb. 15, 1961 |